United States Patent
Morris et al.

(10) Patent No.: US 11,005,994 B1
(45) Date of Patent: May 11, 2021

(54) SYSTEMS AND METHODS FOR PROVIDING COACHABLE EVENTS FOR AGENTS

(71) Applicant: Nice Ltd., Ra'anana (IL)

(72) Inventors: Robert William Morris, Decatur, GA (US); Jon Augustus Arrowood, Smyrna, GA (US); Brett Victor Forman, Smyrna, GA (US)

(73) Assignee: Nice Ltd., Ra'anana (IL)

( * ) Notice: Subject to any disclaimer, the term of this patent is extended or adjusted under 35 U.S.C. 154(b) by 0 days.

(21) Appl. No.: 15/931,880

(22) Filed: May 14, 2020

(51) Int. Cl.
*H04M 3/00* (2006.01)
*H04M 3/51* (2006.01)
*G06Q 10/06* (2012.01)
*H04M 3/22* (2006.01)

(52) U.S. Cl.
CPC .... *H04M 3/5175* (2013.01); *G06Q 10/06398* (2013.01); *H04M 3/2218* (2013.01)

(58) Field of Classification Search
CPC .............. H04M 3/5175; H04M 3/2218; G06Q 10/06398; G06Q 10/502057
See application file for complete search history.

(56) References Cited

U.S. PATENT DOCUMENTS

| | | | |
|---|---|---|---|
| 7,650,282 B1 | 1/2010 | Morris | |
| 7,904,296 B2 | 3/2011 | Morris | |
| 7,949,527 B2 | 5/2011 | Arrowood et al. | |
| 8,170,873 B1 | 5/2012 | Morris | |
| 8,311,828 B2 | 11/2012 | Arrowood et al. | |
| 8,429,171 B2 | 4/2013 | Morris et al. | |
| 8,719,022 B2 | 5/2014 | Arrowood et al. | |
| 9,001,976 B2 | 4/2015 | Arrowood et al. | |
| 9,361,879 B2 | 6/2016 | Morris et al. | |
| 9,697,278 B2 | 7/2017 | Morris et al. | |
| 9,697,825 B2 | 7/2017 | Arrowood et al. | |
| 10,269,352 B2 | 4/2019 | Morris et al. | |
| 10,630,680 B2 | 4/2020 | Arrowood et al. | |
| 2007/0195945 A1* | 8/2007 | Korenblit | G06Q 10/06311 379/265.06 |
| 2016/0094411 A1* | 3/2016 | Brennan | H04L 41/046 709/224 |
| 2018/0091654 A1* | 3/2018 | Miller | G06Q 50/2057 |
| 2019/0244052 A1* | 8/2019 | Narasimha | G06K 9/00288 |
| 2020/0342016 A1 | 10/2020 | Morris | |

* cited by examiner

*Primary Examiner* — Rasha S Al Aubaidi
(74) *Attorney, Agent, or Firm* — Pearl Cohen Zedek Latzer Baratz LLP (57) ABSTRACT

A method for providing coachable events for agents within a call center is provided. Behavior score waveforms for interactions and behaviors can be determined. Events can be identified in the behavior score waveforms within identified durations, and a relevancy of one or more events to one or more behaviors can be determined.

21 Claims, 4 Drawing Sheets

SYSTEMS AND METHODS FOR PROVIDING COACHABLE EVENTS FOR AGENTS

FIELD OF THE INVENTION

The invention relates generally relates to technology for identifying and detecting coachable events for agents within a call center.

BACKGROUND OF THE INVENTION

Companies and/or organizations can have call centers for interacting with customers. The call centers typically include agents or representative (e.g., human or bot) that interact with customers. The interactions can be voice, audio, video, text, email, instant messaging and/or other electronic format exchanges. The interactions can be recorded, e.g., audio and/or video recorded, such that the interactions can be analyzed later.

Typically, the volume of interactions recorded can be as high as 200,000 per hour.

Some current systems exist which can determine behavior of agents based on the interaction data. For example, interaction data can be input to previously trained behavior models to determine which particular behaviors an agent (a subset of agents and/or all agents) in a call center exhibit during interactions. However, determining the behavior of agents without understanding events surrounding the behavior can result in an inability to fully understand the cause of the behavior and result in a lack of insight into how to change the behavior. For example, an agent's interactions can be determined to include the behaviors of indifference, friendly and/or appreciative. The events that caused the agent to exhibit the identified behaviors are unknown. Therefore, in current systems, while it typically is possible to coach the agent based on the behavior, e.g., by telling the agent to be less indifferent, current systems do not yield the ability to provide more useful agent coaching information.

Therefore, it can be desirable to improve interaction analysis systems to provide output that can allow particular events to be identified that are correlated to the behavior, to, for example improve agent coaching.

SUMMARY OF THE INVENTION

One advantage of the invention can include an ability to present a particular event that occurred as the likely cause of a behavior to coach agents. This allows supervisors to use modeled results across 100% of their interactions instead of random sampling. Additionally, the coaching analysis can be fully customized to each contact center.

In one aspect, the invention involves a method for providing coachable events for agents within a call center. The method also involves receiving a plurality of interactions that are based on recordings of interactions between customers and agents in the call center. The method also involves for each behavior in a plurality of behaviors and each interaction in the plurality of interactions determining, by the computing device, a behavior score waveform based on the respective interaction to create a plurality of behavior score waveforms. The method also involves for each behavior score waveform, identifying, by the computing device, one or more durations of the behavior score waveform. The method also involves for each event in a plurality of events, identify the particular interaction within the plurality of interactions that the particular event occurred within and associating the particular event with the particular interaction. The method also involves for each behavior score waveform, for each duration of the one or more durations, determining, by the computing device, a number of times each of the one or more events exist within each duration. The method also involves determining, by the computing device, for each behavior and each event that exists in each behavior, a behavior-event score that indicates relevancy of a current event to the behavior based on the corresponding number of times the current event occurs within the duration. The method also involves displaying, by the computing device, for each behavior a ranked list of events with the behavior-event score scores.

In some embodiments, the method involves for each behavior score waveform, for each duration of the one or more durations, determining, by the computing device, a number of times each of the one or more events exist outside each duration. In some embodiments, the method involves determining the behavior-event score is further based on the number of times each of the one or more events exists outside each duration.

In some embodiments, the method involves determining, by the computing device, for each agent of a plurality of agents and each behavior, an average score based on all behavior-event scores for the particular agent. In some embodiments, the method involves identifying the one or more durations further comprises identifying portions of the respective behaviors score waveform that have a value above a predetermined threshold.

In some embodiments, the method involves identifying the one or more durations further comprises identifying portions of the respective behaviors score waveform that have a value below a predetermined threshold. In some embodiments, the method involves receiving, by the computing device, a request for event information for a particular agent of the plurality of agents for a particular behavior of the plurality of behaviors.

In some embodiments, the plurality of interactions are a phonetic index, a transcript or both of the recording of the interactions. In some embodiments, the behavior score waveform is generated based on machine learned behavior models. In some embodiments, the behavior score waveform is further based on sentiment scores for the plurality of interactions, wherein the sentiment scores are based on phrases within the plurality of interactions.

In some embodiments, the method involves determining a number of times each of the one or more events exists within each duration further comprises dilating each duration by a predetermined time. In some embodiments, the method involves determining each behavior-event score is further based on a number of interactions in the plurality of interactions that have interactions or are absent interactions.

In another aspect, the invention includes a computer program product comprising instructions which, when the program is executed cause the computer to receive a plurality of interactions that are based on recordings of interactions between customers and agents in the call center. The program when executed also causes the computer to for each behavior in a plurality of behaviors and each interaction in the plurality of interactions determine a behavior score waveform based on the respective interaction to create a plurality of behavior score waveforms. The program when executed also causes the computer to for each behavior score waveform, identify one or more durations of the behavior score waveform. The program when executed also causes the computer to for each event in a plurality of events, identify the particular interaction within the plurality of interactions that the particular event occurred within and associating the particular event with the particular interaction. The program when executed also causes the computer to for each behavior score waveform, for each duration of the one or more durations, determine a number of times each of the one or more events exist within each duration. The program when executed also causes the computer to determine each behavior and each event that exists in each behavior, a behavior-event score that indicates relevancy of a current event to the behavior based on the corresponding number of times the current event occurs within the duration. The program when executed also causes the computer to display for each behavior a ranked list of events with the behavior-event score scores.

In some embodiments, the computer program product also includes instructions which, when the program is executed cause the computer to for each behavior score waveform, for each duration of the one or more durations, determine a number of times each of the one or more events exist outside each duration.

In some embodiments, the computer program product also includes instructions which, when the program is executed cause the computer to determine the behavior-event score is further based on the number of times each of the one or more events exists outside each duration.

In some embodiments, the computer program product also includes instructions which, when the program is executed cause the computer to determine for each agent of a plurality of agents and each behavior, an average score based on all behavior-event scores for the particular agent.

In some embodiments, the computer program product also includes instructions which, when the program is executed cause the computer to identifying portions of the respective behaviors score waveform that have a value above a predetermined threshold.

In some embodiments, the computer program product also includes instructions which, when the program is executed cause the computer to identifying portions of the respective behaviors score waveform that have a value below a predetermined threshold. In some embodiments, the computer program product also includes instructions which, when the program is executed cause the computer to receive a request for event information for a particular agent of the plurality of agents for a particular behavior of the plurality of behaviors.

In some embodiments, the computer program product wherein the behavior score waveform is generated based on machine learned behavior models. In some embodiments, the computer program product also includes instructions which, when the program is executed cause the computer to determine a number of times each of the one or more events exists within each duration further comprises dilating each duration by a predetermined time.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
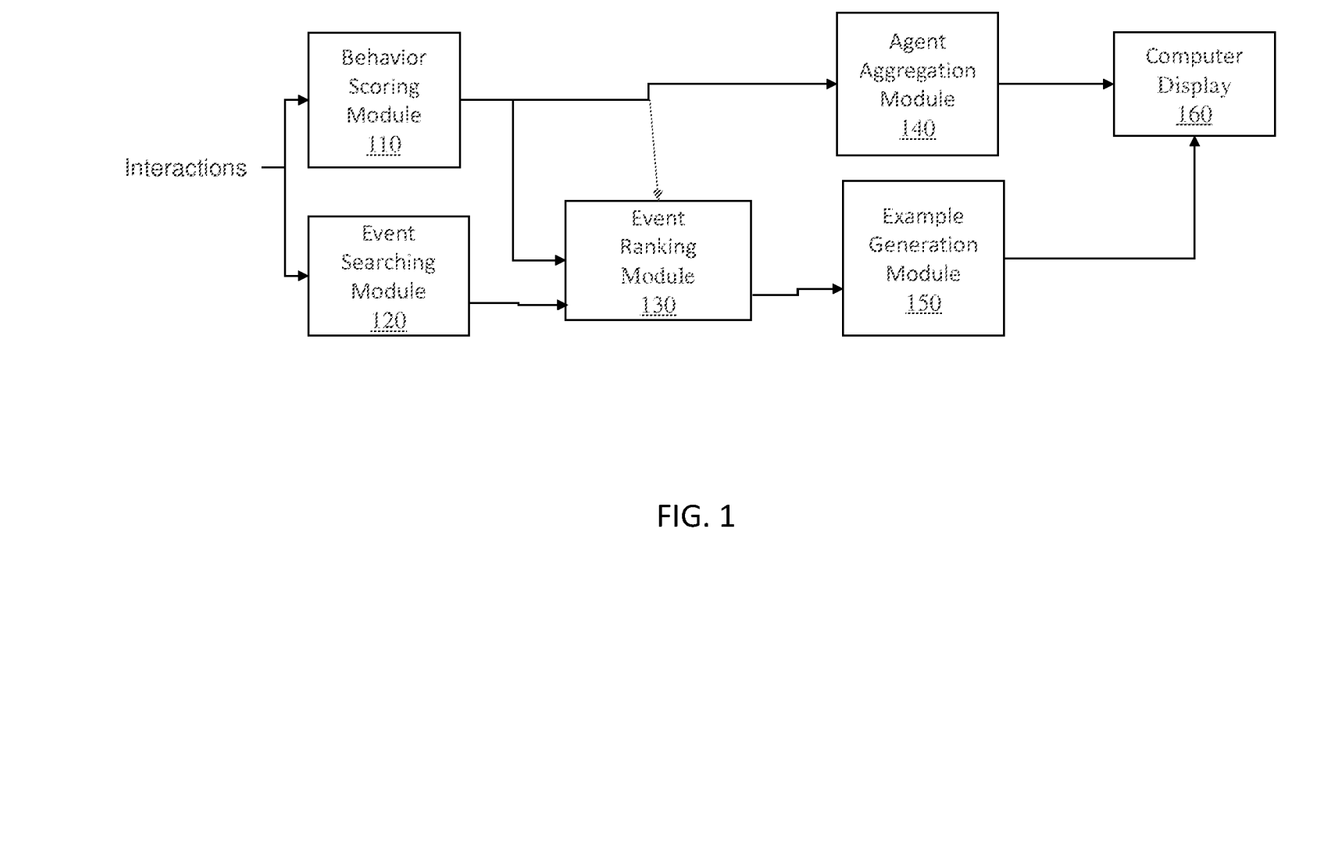
FIG. 1 is a block diagram of a system for providing coachable events for agents within a call center, according to an illustrative embodiment of the invention.

FIG. 1 is a block diagram of a system 100 for providing coachable events for agents within a call center, according to an illustrative embodiment of the invention.

The system 100 includes a behavior scoring module 110, an event searching module 120, an event ranking module 130, an agent aggregation module 140, an example generation module 150, and a computer display 160.

The behavior scoring module 110 can receive a plurality of interactions. The plurality of interactions can include interaction data that was captured during interactions between agents and customers. The agents and our customers can be humans, virtual agents, and/or bots in any combination. The interaction data can include a unique agent identifier, a unique customer identifier, a unique interaction identifier, content of the interaction (e.g., a portion or all of the recorded conversation (video and/or audio), text, email chain, etc.) between the agent and the customer. The interaction data can also include date and/or time information. The interaction data can include other data as is known in the art that is typically captured by interaction systems.

The interaction data can be converted from one format to another. The interaction data can include more than one different format of data. For example, an interaction may include an audio recording and/or a text version of that conversation created by automatic spec recognition (ASR). Text versions of interactions may be stored and searched for.

The interaction data can be received via wired and wireless communication. The interaction data can be retrieved by the system 100 instead of received. In some embodiments, the interaction data is both retrieved and received from the system 100.

The behavior scoring module 110 can determine behavior score waveforms. A behavior score waveform can be a behavior score over time that is for a particular behavior. For example, behavior score waveforms can be determined for behaviors as follows: empathy, kindness, brevity, clarity, and compassion. The behaviors can be input by a user. The behaviors can be selected by a user from a database of stored behaviors. The behaviors can be previously defined behaviors or newly defined behaviors.

Each behavior score waveform can be based on the interaction data. The behavior score waveform can be determined for each behavior in a plurality of behaviors and for each interaction in the interaction data. If there are n behaviors and m interactions then j behavior score waveform can be determined, where n, m, and j are all integer values. A behavior score waveform can be determined for each unique combination of behaviors and waveforms, $BW_j$ $(b_n, i_m)$. For example, assume there are three behaviors, $b_1$, $b_2$, $b_3$, and two interactions, $i_1$, $i_2$, then six behavior score waveforms can be determined as follows: $BW_1(b_1, i_1)$, $BW_2(b_1, i_2)$, $BW_3(b_2, i_1)$, $BW_4(b_2, i_2)$, $BW_5(b_3, i_1)$, $BW_6(b_3, i_2)$. In various embodiments, the number of behaviors and interactions are between 10 and hundreds of thousands.

Each behavior score waveform ($BW_j$) can be determined as follows:

$$BW_j = \Sigma_{i=1}^{N} W(t_j - t_i) S_i \qquad \text{EQN. 1}$$

$$W(t) = \exp(-at^2) \qquad \text{EQN. 2}$$

where $BW_j$ is the behavior score waveform, j is an index into a particular word, i is an index into a particular score at a particular time, where N is a total number of sentiment phrase entries, W(t) is a gaussian weighting window, $t_i$ is a start time of element i, $t_j - t_i$ is a time difference between the waveform time and the time of the phrase, a is a smoothing factor, and $S_i$ is a sentiment score of element i. $W(t_j - t_i)$ can be equal to 1.0 when the phrase occurs at the point in time, and become smaller the further away the phrase becomes to the point in time on the waveform. The sentiment score $S_i$ can be determined based on a bag-of-phrase model that maps various phrases that can occur in a particular interaction to a score. Table 3 below shows an example of mapping phrases to a sentiment score.

TABLE 3

| Phrase | SentimentScore |
| --- | --- |
| RIDICULOUS | −2.3 |
| TALK TO YOUR SUPERVISOR | −1.3 |
| ... | |
| WONDERFUL | 1.2 |
| THANK YOU SO MUCH | 1.4 |

As shown in Table 3, in this example, more negative phrases are mapped to lower scores while more positive phrases are mapped to higher scores. The transcripts (e.g., as generated by automatic speech recognition system based on audio recordings of interactions) can include a table of phrases with 1-4 sequences along with a start time and end time offset (e.g., as generated by the automatic speech recognition system). For example, for a transcript of "thank you for calling how may" where the start time in seconds for each word is 0, 0.3, 0.5, 0.6, 0.9, 1.0 and 1.2, respectively, can have 2, 3 and 4 word sequences with respective start time offsets and end time offsets, as shown below in Table 4.

TABLE 4

| Phrase | Starts Time Offset | Ends Times Offsets |
| --- | --- | --- |
| THANK | 0 | 0.3 |
| THANK YOU | 0 | 0.5 |
| THANK YOU FOR | 0 | 0.6 |
| THANK YOU FOR CALLING | 0 | 0.9 |
| YOU | 0.3 | 0.5 |
| YOU FOR | 0.3 | 0.6 |
| YOU FOR CALLING | 0.3 | 0.9 |
| YOU FOR CALLING HOW | 0.3 | 1.0 |
| FOR | 0.5 | 0.6 |
| FOR CALLING | 0.5 | 0.9 |
| FOR CALLING HOW | 0.5 | 1.0 |
| FOR CALLING HOW MAY | 0.5 | 1.2 |

During sentiment calculations for an individual call, an inner join of the sentiment table can be determined with the transcription data to produce sentiment results. For example, relevant sentiment phrase matches that can be used in future sentiment calculations can be determined and associated with their respective start time offset and end time offset, as shown in Table 5 below.

TABLE 5

| Phrase | Sentiment Score | Start Time Offset | End Time Offset |
| --- | --- | --- | --- |
| SUPERVISOR | −1.2 | 102.3 | 102.5 |
| RIDICULOUS | −2.3 | 120.3 | 120.6 |
| I'M FRUSTRATED | −1.0 | 130.2 | 131.0 |

A behavior score for each behavior score waveform can be determined. The behavior score can be the sum of sentiment score $S_i$ from 1 to N, where N is the number of phrases in the transcript.

In some embodiments, the behavior score for each behavior score waveform is based on a corresponding behavior model. For example, assume behavior $b_1$ is pleasant, and behavior $b_2$ is distant, and there is one interaction $i_1$. In this example there are two behavior models, one for the behavior pleasant and one for the behavior distant. To determine a behavior score for behavior $b_1$, interaction $i_1$, the interaction data corresponding to interaction $i_1$ can be applied to the pleasant behavior model. To determine a behavior score for behavior $b_2$, interaction $i_1$, the interaction data corresponding to interaction $i_1$ can be applied to the distant behavior model. The behavior models can be models trained via a neural network (e.g., convolutional or recurrent neural networks). The behavior models can be input by a user.

Figure 2A:
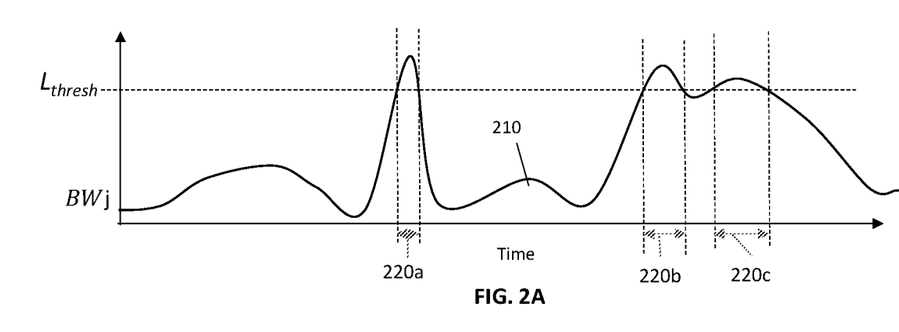
FIG. 2A is an example of a behavior score waveform, according to some embodiments of the invention.

In some embodiments, the behavior scoring module 110 identifies one or more durations within each behavior score waveform that are likely to include event data that influenced the behavior score. The identification can be based on determining durations of the behavior score waveform that are above a threshold. For example, turning to FIG. 2A, FIG. 2A is an example of a behavior score waveform ($BW_j$) 210 according to some embodiments of the invention. The behavior score waveform ($BW_j$) 210 has three windows, 220a, 220b, and 220c that are above the threshold $L_{thresh}$.

In some embodiments, the threshold $L_{thresh}$ is based on the behavior type. For example, for a behavior that is pleasant, the threshold can be a larger value. In another example, for a behavior that is unpleasant, the threshold can be a lower value. In some embodiments, the threshold $L_{thresh}$ can be input by a user. In some embodiments, if there are no durations that are above the threshold in the behavior score waveform, the threshold $L_{thresh}$ can be lowered.

In some embodiments, the identification of the durations is based on determining durations of the behavior score waveform that are below the threshold $L_{thresh}$.

In some embodiments, the durations are expanded. The durations can be expanded if the durations are close to each other such that they almost overlap (e.g., within a few milliseconds of each other or any predefined duration). In some embodiments, if no events are found within the durations within the thresholds, the duration can be expanded. The durations can be expanded based on a duration dilation time $T_D$. The duration dilation time $T_D$ can be input by a user.

In some embodiments, if expanding the duration leads to an overlap in time of two or more, the overlapped durations are merged.

Figure 2B:
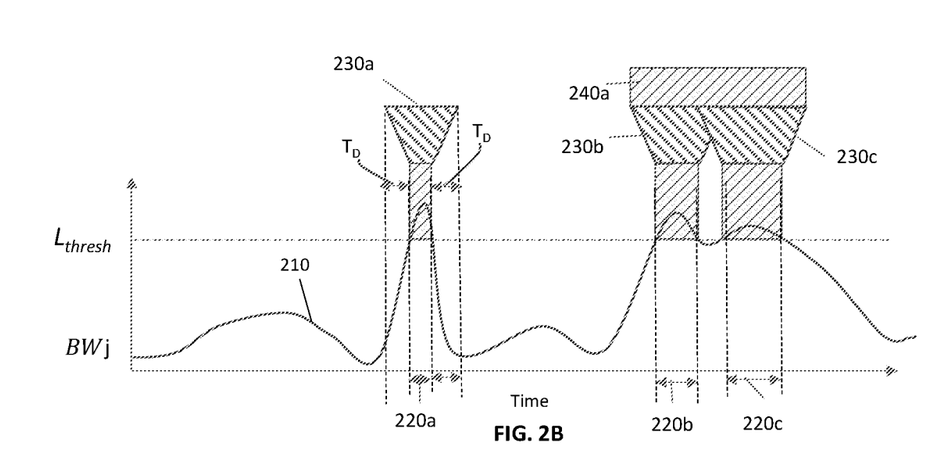
FIG. 2B is an example of the behavior score waveform of FIG. 2A with identified durations dilated and merged, according to some embodiments of the invention.

For example, turning to FIG. 2B, FIG. 2B is an example of the behavior score waveform ($BW_j$) 210 of FIG. 2A with the identified durations dilated and merged, according to some embodiments of the invention. The three durations 220a, 220b, and 220c are dilated by $T_D$. For duration 220a, the dilated duration is 230a, for duration 220b, the dilated duration is 230b, and for duration 220c, the dilated duration is 230c. For the sake of simplicity, the duration $T_D$ is only shown on FIG. 2B with respect to duration 220a. Duration 220b, and 220c are each similarly dilated by $T_D$ as is shown for 220a. FIG. 2B shows that durations 220b and 220c overlap, and are merged into duration 240a.

Each duration identified in a behavior score waveform can have properties as are shown below in Table 6.

TABLE 6

| Name | Type |
| --- | --- |
| InteractionID | Int |
| BehaviorID | Int |
| StartOffset | Int |
| EndOffset | Int |
| Positive | Bool | where InteractionID is the particular interaction of the plurality of interactions for the behavior score waveform, BehaviorID is a unique identifier for the particular behavior for the behavior score waveform (e.g., behavior "pleasant" with a unique identifier of "1"), StartOffset is a time offset at an earliest time in an identified duration of a respective interaction, EndOffset is a time offset at a latest time in the identified duration of the respective, Positive is an indicator whether the duration was identified by finding durations where behavior score waveform is above the threshold or below the threshold.

In some embodiments, the behavior scoring waveform is a step function.

Turning back to FIG. 1, the event searching module 120 can receive the interaction data and locate events that occurred within the interaction data. For each event that is located, it can be associated with its corresponding interaction. For example, each event in the interaction data can have properties as are shown below in Table 7.

TABLE 7

| Name | Type |
| --- | --- |
| InteractionID | Int |
| EventID | Int |

TABLE 7-continued

| Name | Type |
| --- | --- |
| StartOffset | Int |
| EndOffset | Int |
| Score | Float | where InteractionID is the particular interaction for the identified event, EventID is a unique identifier for the event, StartOffset is a number of milliseconds into an interaction where the identified event starts, EndOffset is a number of milliseconds into an interaction where the identified event starts, and score (e.g., floating point value) is a value that represents quality of the match.

Events can be located in the interaction data based on one or more queries. A set of queries (e.g., queries input by a user and/or received from another computing device) can be used to search the interaction data for events. Each time a query is satisfied, this can be identified as an event. For each event, the corresponding interaction that the event occurred within can be associated with the event (e.g., as shown above in Table 7).

Table 8 below shows an example of a query format used to identify events.

TABLE 8

| Operator | Description |
| --- | --- |
| OR( ) | True if any of subexpressions found |
| AND_x( ) | True if all of subexpressions found within x seconds |
| BEFORE_x( ) | True if first expression occurs before second expression |
| AND( ) | True if all subexpressions found in same file |
| ANDNOT x( ) | True if first expression found, but not any following within x seconds |
| ANDNOT( ) | True if first expression found, but not any following within same file |
| FIRST_x( ) | True if expression found in first x seconds |
| LAST_x( ) | True if expression found in last x seconds |
| NOTFIRST_x( ) | True if expression not found in first x seconds |
| NOTLAST_x( ) | True if expression not found in last x seconds |

The event searching module 120 can output all events identified in the interaction data.

The event ranking module 130 can receive as input the output of the behavior scoring module 110 (e.g., either behavior scores, behavior score waveforms, or one or more durations of behavior score waveforms) and/or can receive the output of identified events of the event searching module 120.

The event ranking module 130 can determine a behavior-event score based on received either behavior scores, behavior score waveforms, or one or more durations of behavior score waveforms, and/or identified events. For each unique combination of behavior and event, a behavior-event score can be determined. For example, assume that the event ranking module 130 receives two behaviors $b_1$ and $b_2$ and three events, $e_1$, $e_2$ and $e_3$, a behavior-event score can determined for $b_1$, $e_1$; $b_1$, $e_2$; $b_1$, $e_3$; $b_2$, $e_1$; $b_2$, $e_2$; and $b_2$, $e_3$.

The behavior-event score can indicate a relevancy of a particular event to a particular behavior. The behavior-event score can be determined by searching each of the behavior score waveforms for a particular behavior for one or more events. For example, for a behavior of "pleasant" having a unique identifier (e.g., behaviorID) of 1, all of the behavior score waveforms in the interaction data can be searched for having the event "pleasant" and a behavior-event score can be determined for each interaction that has the event "pleasant." The one or more events can be input by the user.

The events can be identified by matching the one or more events input by the user with one more events in the behavior score waveforms for a particular behavior as shown below:

```
def Match(behaviorID,eventID,interactionID, positive):
    match=0
    for window in windows where
        behavior.InteractionID==interactionID and
        behavior.BehaviorID==behaviorID
        behavior.Positive==positive:
        for result in results where
            result.InteractionId==interactionID and
            result.EventId==eventID:
            if result.StartOffset<window.EndOffset and
                window.StartOffset<result.EndOffset:
                match=1
    return match
```

Each match can be used to determine the following parameters as shown below in Table 9.

TABLE 9

| Name | Description |
|---|---|
| N | Number of interactions |
| $N_b$ | Number of interactions that include a behavior duration where BehaviorID == b |
| $N_{be}$ | Number of event matches where EventID == e occurs in duration where BehaviorID == b |
| $N_{\overline{b}e}$ | Number of event matches where EventID == e occurs outside of any BehaviorID == b |
| $N_{\overline{be}}$ | Number of interactions with neither behavior nor event |
| $N_{b\overline{e}}$ | Number of interactions with behavior duration, but no event |

Each behavior-event score, BEScore (b,e) can be determined as shown below in EQN. 3 and EQN. 4:

$$MutInf(b, e) = \frac{N_{be}}{N}\log_2\frac{NN_{be}}{(N_{be}+N_{\overline{b}e})(N_{be}+N_{b\overline{e}})} +$$
$$\frac{N_{b\overline{e}}}{N}\log_2\frac{NN_{b\overline{e}}}{(N_{b\overline{e}}+N_{\overline{be}})(N_{be}+N_{b\overline{e}})} +$$
$$\frac{N_{\overline{b}e}}{N}\log_2\frac{NN_{\overline{b}e}}{(N_{be}+N_{\overline{b}e})(N_{\overline{be}}+N_{\overline{b}e})} +$$
$$\frac{N_{\overline{be}}}{N}\log_2\frac{NN_{\overline{be}}}{(N_{b\overline{e}}+N_{\overline{be}})(N_{\overline{be}}+N_{\overline{b}e})}$$

EQN. 3

$$BEScore(b, e) = MutInf(b, e) * \text{sign}\left(\frac{N_{be}}{N_{be}+N_{b\overline{e}}} - \frac{N_{\overline{b}e}}{N_{\overline{b}e}+N_{\overline{be}}}\right)$$

EQN. 4

In some embodiments, the behavior-event score is determined based on a correlation, or phi coefficient, for example, as shown below in EQN. 5.

$$corr(b, e) = \frac{N_{be}N_{\overline{be}} - N_{\overline{b}e}N_{b\overline{e}}}{\sqrt{N_b N_{\overline{b}} N_e N_{\overline{e}}}}$$

EQN. 5

The behavior-event scores can be used to create a behavior-event score record for each unique combination of behavior and event, for example, as shown below in Table 10.

TABLE 10

| Name | Type |
|---|---|
| EventID | Int |
| BehaviorID | Int |
| Positive | Bool |
| Behavior-Event Score | Float |

In some embodiments, a predefined number of top behavior-event scores are presented to a user. In some embodiments, the user overrides a high behavior-event score (e.g., the association of a behavior with an event). For example, if the event contraindicates the behavior.

In some embodiments, filtering is performed on the behavior-event scores. The filtering can be done based on the behavior-event score meeting a threshold, the duration in the behavior score waveform including a particular event, or any combination thereof. The filtering can be done as follows:

```
def KeepEvent(event, behavior, globalScoreThreshold):
    //Check if match occurs with positive or negative
    matchPos=Match(behavior.behaviorID, event.eventID,
        event.interactionID, True)
    matchNeg=Match(behavior.behaviorID, event.even-
        tID, event.interactionID, False)
    if matchPos or matchNeg:
        //Get the event ranking for relevant behavior direc-
            tion (matchPos) eventRanking=rankings where
    ranking.EventID==event.EventID and
        ranking.BehaviorID==behavior.BehaviorID and
        ranking.Positive=matchPos
        return eventRanking.Score>globalScoreThreshold
    else:
        return False
```

The filtered behavior-event scores can be recorded as shown below in Table 11.

TABLE 11

| Name | Type |
|---|---|
| InteractionID | Int |
| EventID | Int |
| BehaviorID | Int |
| StartOffset | Int |
| EndOffset | Int |
| Behavior-Event Score | Float |

The agent aggregation module 140 can receive as input, output from the behavior scoring module 110, of behaviors scores, behavior score waveforms and/or the interaction data. The interaction data can be used to associate interactions to agents as shown, for example below in Table 12.

TABLE 12

| Name | Type |
|---|---|
| InteractionID | Int |
| AgentID | Int |

In some embodiments, the agent aggregation module 140 normalizes behavior scores for each behavior, for example, as shown in Table 13 below.

TABLE 13

| Name | Type |
| --- | --- |
| BehaviorId | Int |
| AverageScore | Float |
| StandardDev | Float |
| LowerThreshold | Float |
| UpperThreshold | Float | where AverageScore is an average of all of the behavior scores for a particular behavior, b, StandardDev is the mean and/or standard deviation of all of the behavior scores for the particular behavior b. LowerThreshold and UpperThreshold are equal to a fixed number of standard deviations (e.g., typically 1) above and below the AverageScore.

In some embodiments, the agent aggregation module 140 determines for each agent and behavior, a set of scores over a set of interactions. For each unique agent and behavior pair, all interactions with the same identifier can be grouped and the agent data can be aggregated as shown below in Table 14.

TABLE 14

| Name | Type |
| --- | --- |
| AgentId | Int |
| BehaviorId | Int |
| AverageScore | Float |
| AverageScoreRank | Int |
| LowScorePercent | Float |
| LowScorePercentRank | Int |
| HighScorePercent | Float |
| HighScorePercentRank | Int | where AverageScore is the mean of the behavior scores for the grouped interactions, LowScorePercent is the percentage of interactions with a score below a lower threshold, wherein the lower threshold can be one standard deviation below the average score and/or behavior dependent, HighScorePercent is the percentage of interactions with a score above an upper threshold, wherein the upper threshold can be one standard deviation above the average score and/or behavior dependent, AverageScoreRank is a ranking order between all agents in the interaction data, LowScorePercentRank is the percentage of interactions with a score below the lower threshold for all agents in the interaction data, LowScorePercentRank is the percentage of interactions with a score above the upper threshold for all agents in the interaction data.

The example generation module 150 can receive as input the output (e.g., the behavior-event scores and/or the filtered behavior-event scores) from the event ranking module 130. The example generation module 150 can locate particular event examples for an agent and/or behavior. Every event that is relevant can be collected based on its occurrence during a behavior by an agent, during a behavior window.

SELECT InteractionID, EventID, StartOffset, EndOffset, Behavior-Event Score

FROM FilteredBehaviorEventScores (Table 11)

JOIN BehaviorWindows (Table 6) on FilteredBehaviorEventScores.BehaviorID=BehaviorWindows.BehaviorID JOIN Events (Table 7) on Events.EventID= FilteredBehaviorEventScores.EventID AND (Events.InteractionID=BehaviorWindows.InteractionID) AND (Events.StartOffset>= BehaviorWindows.StartOffset) AND (Events.StartOffset<BehaviorWindows.EndOffset)

JOIN AgentData (Table 12) on AgentData.InteractionID=BehaviorWindows.InteractionID WHERE AgentData.AgentID=SelectedAgent AND BehaviorWindows.BehaviorId=Selected Behavior In some embodiments, these examples are presented to the user, being sorted descending by score. In some embodiments, these examples are grouped by InteractionID, and a score for each interaction ID is calculated by summing the behavior-event score for each result. These interactions can be presented in descending order of behavior-event score. This can allow for interactions with more events to rise to the top. On selecting an interaction, the user can be presented with a list of events within that interaction.

The output from the example generation module 150 and/or the agent aggregation module 140 can be transmitted to a display. In some embodiments, a table as shown below in Table 15 can be displayed.

TABLE 15

| Behavior | Acknowledge Loyalty | | Empathy | | Listen Actively | | Build Rapport | |
| --- | --- | --- | --- | --- | --- | --- | --- | --- |
| Agent | HScorePR | LScorePR | HScorePR | LScorePR | HScorePR | LScorePR | HScorePR | LScorePR |
| 65423 | 3 | 5 | 23 | 24 | 14 | 15 | 13 | 15 |
| 62844 | 25 | 23 | 2 | 4 | 12 | 13 | 16 | 19 |
| ... | | | | | | | | |

In various embodiments, any of the interaction data, and/or data determined at the output or within intermediate steps of each of the modules in FIG. 1 can be transmitted to the display in various configurations.

In some embodiments, a supervisor can select any of the behaviors and obtain all events that can be used as example for coaching.

Figure 3:
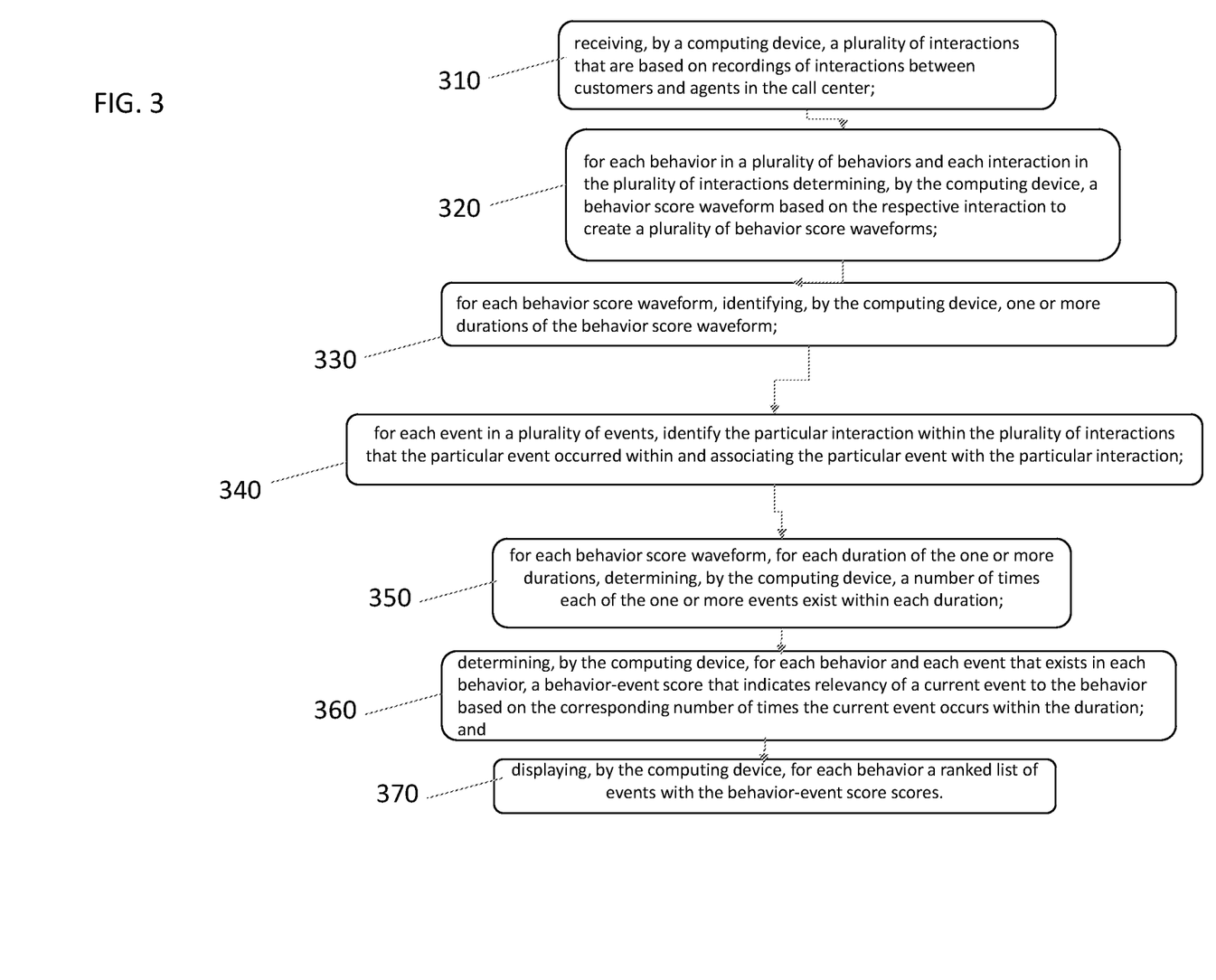
FIG. 3 is a flow chart of a method for providing coachable events for agents within a call center, according to an illustrative embodiment of the invention.

FIG. 3 is a flow chart of a method for providing coachable events for agents within a call center, according to an illustrative embodiment of the invention.

The method involves receiving a plurality of interactions that are based on recordings of interactions between customers and agents in the call center (Step 310). Each of the plurality of interactions can include interaction data, for example, as described above with respect to FIG. 1. The interaction data can be interaction data from a single call center or multiple call centers. The plurality of interactions can be received from a database where interaction data is stored, from other interaction systems, input by a user or any combination thereof. The interaction data can be a phonetic index and/or a transcript of a recording of an interaction.

The method also involves for each behavior in a plurality of behaviors and each interaction in the plurality of interactions determining a behavior score waveform (e.g., behavior score waveform 210 as described above in FIG. 2A) based on the respective interaction to create a plurality of behavior score waveforms (Step 320). The behavior score waveform can be determined based on machine learned behavior modules. The behavior score waveform can be determined based on one or more sentiment scores.

As described above with respect to FIG. 1, a plurality of behaviors can be input by a user, retrieved from memory, or any combination thereof. Each of the plurality behaviors can be any behavior of interest. For example, if the call center is a depression hotline, the plurality of behaviors can include empathy, understanding, and/or calmness. In another example, if the call center is for banking, the plurality of behaviors can include directness, clarity, and/or fairness.

The behavior score waveform can be determined as described above with respect to the behavior scoring module 110 of FIG. 1.

The method also involves for each behavior score waveform, identifying, by the computing device, one or more durations of the behavior score waveform (Step 330). The one or more durations can be durations within the behavior score waveform that likely include coachable events. The one or more durations can be determined as described above with respect to the event ranking module 130 of FIG. 1. In some embodiments, the one or more durations are dilated and/or merged, as described above.

The method also involves for each event in a plurality of events, identify the particular interaction within the plurality of interactions that the particular event occurred within and associating the particular event with the particular interaction (Step 340). The plurality of events can be input by a user, retrieved from memory, or any combination thereof. The interaction data can be searched to identify each of the plurality of events. Upon identifying each event in the interaction data, the particular interaction where the event occurred can be associated with the event. Associated the particular event with the particular interaction for each event in the plurality of events can be done as described above with respect to the event searching module 120 of FIG. 1.

The method also involves for each behavior score waveform, for each duration of the one or more durations (or dilated and or merged durations), determining a number of times each of the one or more events exist within each duration (Step 350). In some embodiments, the method also involves determining a number of times each of the one or more events exists outside of each duration.

In various embodiments, the method involves determining the number of times each of the one or more events exist within or outside of the behavior waveform (e.g., if there were no durations identified in the behavior score waveform). The number of times each of the one or more events exist within each duration can be done as described above with respect to the event ranking module 130 of FIG. 1.

The method also involves determining for each behavior and each event that exists in each behavior, a behavior-event score that indicates relevancy of a current event to the behavior based on the corresponding number of times the current event occurs within or outside of the duration (Step 360). As described above in FIG. 1, for each unique behavior and event pair from the plurality of behaviors and the plurality of events, a behavior-event score can be determined.

The method also involves displaying, by the computing device, for each behavior a ranked list of events with the behavior-event score scores (Step 370). The ranked list of events can be determined as described above in FIG. 1.

Figure 4:
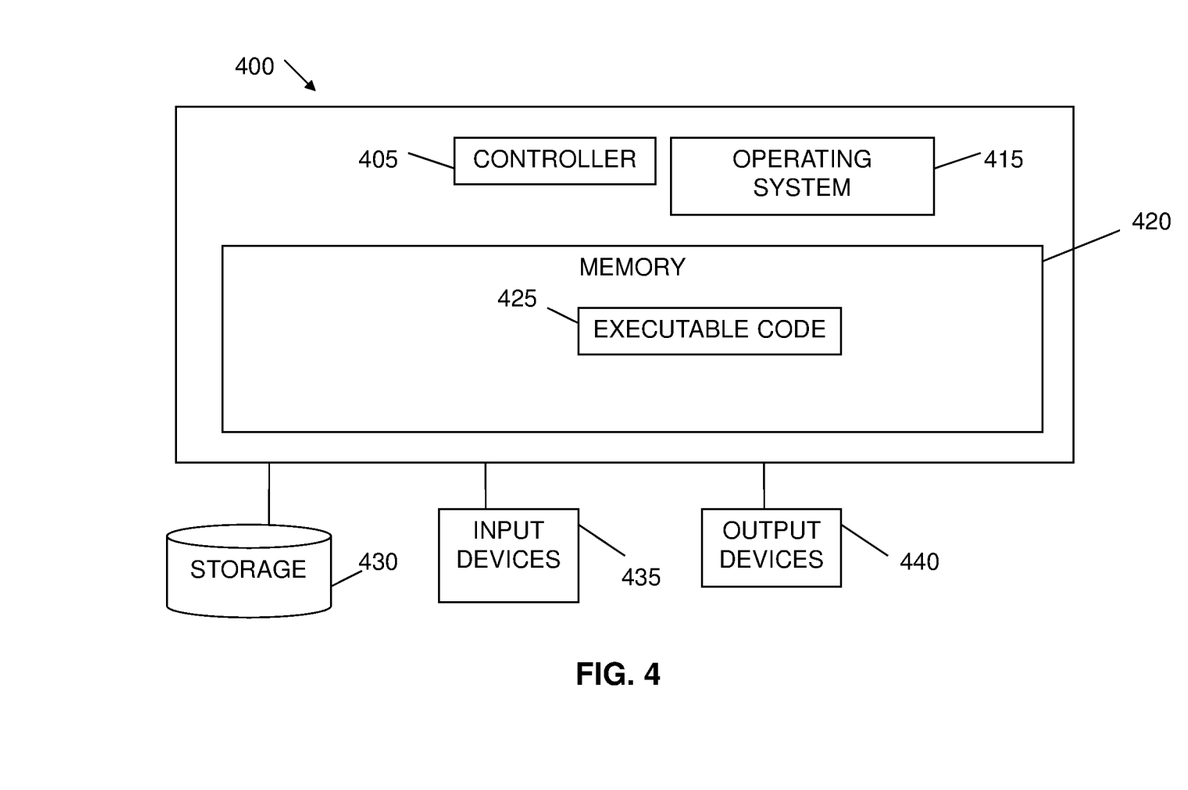
FIG. 4 is a block diagram of a computing device which can be used with embodiments of the invention.

FIG. 4 shows a block diagram of a computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g. code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 330 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 3 can be omitted.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

What is claimed is:

1. A method for providing coachable events for agents within a call center, the method comprising:
    receiving, by a computing device, a plurality of interactions that are based on recordings of interactions between customers and agents in the call center;
    determining, by the computing device, for each agent behavior in a plurality of agent behaviors and each interaction in the plurality of interactions, a behavior score waveform based on the respective interaction to create a plurality of behavior score waveforms;
    identifying, by the computing device, for each behavior score waveform, one or more durations of the behavior score waveform;
    identifying, by the computing device, for each event in a plurality of events, the particular interaction within the plurality of interactions that the particular event occurred within and associating the particular event with the particular interaction, wherein each event comprises properties that describe the event;
    determining, by the computing device, for each behavior score waveform, for each duration of the one or more durations, a number of times each of the one or more events exist within each duration;
    determining, by the computing device, for each behavior and each event that exists in each behavior, a behavior-event score that indicates relevancy of a current event to the behavior based on the corresponding number of times the current event occurs within the duration; and
    displaying, by the computing device, for each behavior a ranked list of events with the behavior-event score scores.

2. The method of claim 1 further comprising for each behavior score waveform, for each duration of the one or more durations, determining, by the computing device, a number of times each of the one or more events exist outside each duration.

3. The method of claim 1 wherein determining the behavior-event score is further based on the number of times each of the one or more events exists outside each duration.

4. The method of claim 1, further comprising:
determining, by the computing device, for each agent of a plurality of agents and each behavior, an average score based on all behavior-event scores for the particular agent.

5. The method of claim 1, wherein identifying the one or more durations further comprises identifying portions of the respective behaviors score waveform that have a value above a predetermined threshold.

6. The method of claim 1, wherein identifying the one or more durations further comprises identifying portions of the respective behaviors score waveform that have a value below a predetermined threshold.

7. The method of claim 1 further comprising:
receiving, by the computing device, a request for event information for a particular agent of the plurality of agents for a particular behavior of the plurality of behaviors.

8. The method of claim 1 wherein the plurality of interactions are a phonetic index, a transcript or both of the recording of the interactions.

9. The method of claim 1 wherein the behavior score waveform is generated based on machine learned behavior models.

10. The method of claim 1 wherein the behavior score waveform is further based on sentiment scores for the plurality of interactions, wherein the sentiment scores are based on phrases within the plurality of interactions.

11. The method of claim 1 wherein determining a number of times each of the one or more events exists within each duration further comprises dilating each duration by a predetermined time.

12. The method of claim 1 wherein determining each behavior-event score is further based on a number of interactions in the plurality of interactions that have interactions or are absent interactions.

13. A non-transitory computer program product comprising instructions which, when the program is executed cause the computer to:
receive a plurality of interactions that are based on recordings of interactions between customers and agents in the call center;
determine for each agent behavior in a plurality of agent behaviors and each interaction in the plurality of interactions a behavior score waveform based on the respective interaction to create a plurality of behavior score waveforms;
identify for each behavior score waveform, one or more durations of the behavior score waveform;
identify for each event in a plurality of events, the particular interaction within the plurality of interactions that the particular event occurred within and associating the particular event with the particular interaction, wherein each event comprises properties that describes the event;
determine for each behavior score waveform, for each duration of the one or more durations, a number of times each of the one or more events exist within each duration;
determine each behavior and each event that exists in each behavior, a behavior-event score that indicates relevancy of a current event to the behavior based on the corresponding number of times the current event occurs within the duration; and
display for each behavior a ranked list of events with the behavior-event score scores.

14. The non-transitory computer program product of claim 13 comprising instructions which, when the program is executed cause the computer to:
for each behavior score waveform, for each duration of the one or more durations, determine a number of times each of the one or more events exist outside each duration.

15. The non-transitory computer program product of claim 13 wherein determining the behavior-event score is further based on the number of times each of the one or more events exists outside each duration.

16. The non-transitory computer program product of claim 13 comprising instructions which, when the program is executed cause the computer to:
determine for each agent of a plurality of agents and each behavior, an average score based on all behavior-event scores for the particular agent.

17. The non-transitory computer program product of claim 13 wherein identifying the one or more durations further comprises identifying portions of the respective behaviors score waveform that have a value above a predetermined threshold.

18. The non-transitory computer program product of claim 13 wherein identifying the one or more durations further comprises identifying portions of the respective behaviors score waveform that have a value below a predetermined threshold.

19. The non-transitory computer program product of claim 13 comprising instructions which, when the program is executed cause the computer to:
receive a request for event information for a particular agent of the plurality of agents for a particular behavior of the plurality of behaviors.

20. The non-transitory computer program product of claim 13 wherein the behavior score waveform is generated based on machine learned behavior models.

21. The non-transitory computer program product of claim 13 wherein determining a number of times each of the one or more events exists within each duration further comprises dilating each duration by a predetermined time.

* * * * *